Patented May 24, 1949

2,471,356

UNITED STATES PATENT OFFICE 2,471,356

MILL FOR CUTTING FEATHERS

Thomas Slick, San Antonio, Tex.

Application May 19, 1945, Serial No. 594,649

12 Claims. (Cl. 19—4)

This invention relates to mill for cutting feathers; and it comprises a mill for comminuting feathers and other materials of like nature, which comprises an outer casing, a rotary cutting wheel mounted in said casing, a hopper mounted above said casing for receiving the material to be comminuted and provided with a feeding slot at the bottom connecting said hopper with said casing, a rotary feeding wheel mounted at the bottom of said hopper above said feeding slot, a cutting bar mounted just below and preferably forming one edge of said feeding slot, a plurality of cutting blades having outer cutting edges mounted longitudinally on said cutting wheel in cutting proximity to said cutting bar to cut material passed through said feeding slot, shield sections between said cutting blades forming a cylindrical casing surrounding said cutting wheel leaving said cutting edges protruding a short distance, means for exhausting air and comminuted product from said casing and means for rotating said cutting and feeding wheels; all as more fully hereinafter set forth and as claimed.

One of the objects of this invention is to provide a mill for cutting feathers to short and uniform sizes.

A further object of the invention is to provide a mill for cutting feathers in which a revolving drum having cutting blades protruding a short distance from its cylindrical surface is used as a cutting wheel, the cylindrical surfaces of the drum between the blades acting as a shield for directing feathers into the cutting area whereby a greater percentage of feathers are subjected to the cutting blades than was possible in machines of the prior art.

A still further object of this invention is to provide a mill for cutting feathers having a feeding hopper provided with agitating blades of sloping surfaces usually triangular shaped which operate in conjunction with suction at the feeding slot to promote feeding of the feathers into the cutting area whereby a uniform flow of feathers is presented to the cutting blades at all times.

Still another object of this invention is to provide a mill for cutting feathers having suction means for exhausting the feathers which is located at right angles to the feeding slot, the parts of the mill being so arranged that the suction extends to the feeding slot whereby it aids materially in feeding feathers to the cutting area.

The above and other objects are accomplished in the present invention by providing a construction and arrangement of the various parts in the manner hereinafter described.

A large number of different types of mills have been developed for comminuting fibrous products of all sorts. Mills have been already developed which are suitable for cutting rags, leather, paper and the like. But I have found that the cutting of feathers presents a problem which is more difficult and which requires a special type of mill. This is due to the extreme lightness of feathers and to their other characteristic properties. Feathers are difficult to feed through any opening and still more difficult to cut with any degree of uniformity.

I have found that feathers can be fed with a fair degree of uniformity downwardly through a horizontal slot provided that they are agitated above the slot by means of a rotating wheel having blades the ends of which are shaped in such manner that they tend to press the feathers through the slot while a slight degree of suction is provided simultaneously beneath the slot to assist in the feeding operation. But I have also found that in order to satisfactorily comminute feathers fed through a slot in this manner they must be checked or stopped in some manner, before they have passed completely through the slot and have come fully under the influence of the suction. In other words, they must be held momentarily in front of a cutting knife while they are being subjected to the action of a rotary cutting wheel advantageously having blades of helical shape. It is apparently necessary to check and hold the feathers in this manner due to the fact that they pass through the slot at different speeds and that the action of the suction on the feathers is related to their degree of packing, their size, etc.

I have found that a convenient method of checking and holding the feathers before they have passed through the slot is to provide a shield forming a cylindrical casing about the cutting wheel extending between the cutting blades, with the blades protruding slightly beyond the shield. The distance between this shield and the cutting edges of the blades then determines the depth of cut, that is, the fineness of comminution of the product. When such a shield is employed substantially no uncut feathers appear in the comminuted product. The reason for this is apparently due to the fact that the suction forces the feathers to pass for some distance along the helical paths or cutting zones formed between adjacent cutting blades and along on top of the shield sections while being subjected to the action of the cutting knife and the cutting blades at all points along this path. The rotation of the helical blades employed in my cutting mill produces a draft tending to propel the feathers along this same path. In contrast, when no shields are employed the feathers can pass directly out of the feeding slot between the cutting blades without being cut, provided that their velocity is sufficiently high.

My invention can be explained in more detail by reference to the accompanying drawing which shows, more or less diagrammatically, a preferred modification of my feather cutting machine. In this showing, Fig. 1 is a side elevation of my machine, including motors and blower, Fig. 2 is a vertical section through the machine proper, taken along the line 2—2 of Fig. 3, Fig. 3 is a front elevation of the feeding wheel and the cutting wheel of the machine with the front of the outer casing removed, while Fig. 4 is a vertical section through the cutting wheel, taken along the line 4—4 of Fig. 3.

In the various views of my drawing like elements are represented by like reference numerals. Referring first to Fig. 1, a base 1 is provided on which is mounted the housing or casing 2 of the cutting machine or mill, the driving motor 3 and the blower 4 with its motor 5. The mill proper, as shown, is composed of a cutting wheel or cage, shown generally at 6 (Figs. 2, 3 and 4) and a feeding wheel shown generally at 7. The cutting wheel is mounted on shaft 8 which carries pulley 18 and is driven by a belt 17 from motor 3, while the feeding wheel is mounted on shaft 14 and driven from shaft 8 by means of a pulley 19 mounted on said shaft and the crossed belt 20 which drives pulley 21 carried by shaft 14. It will be noted that, owing to the crossed belt 20, the feeding wheel is driven in a direction opposite that of the cutting wheel.

The feeding wheel is enclosed by the feed hopper 22 into which feathers to be cut are dumped. These feathers are agitated in the hopper by the feeding wheel and are drawn through the feeding slot 23 by the suction produced by the blower combined with the action of the feeding wheel. After cutting, the feathers are drawn off horizontally through the flue 24 into the blower 4, finally passing out of conduit 25 into a suitable receptacle. The exhausting means is thus mounted substantially at right angles to the feeding slot in the direction of travel of the cutting blades.

The cutting wheel 6 is provided at each end with a head or hub shown generally at 9; the cutting blades 10 being mounted in slots in each hub and adjustably secured by set screws 11; see Figs. 3 and 4. The hubs are formed with inner off-sets 12 which serve to support shield sections 13 which extend between the blades and are secured by screws 31. The blades protrude above these shield sections a distance which predetermines the depth of feed, that is the fineness of the product. The blades are helical in shape and make an angle of about 30° with the horizontal. These blades are provided with cutting edges 32 which pass in cutting proximity to the cutting bar 26 (Fig. 2) which forms one edge of the feeding slot. The opposite edge of the slot is formed by a bar 27, the position of which determines the width of the feeding slot and is adjustable by means of hand wheel 28. The position of the cutting bar is also adjustable by means of hand wheel 29. The cutting bar makes a small angle with the horizontal in order that the clearance between this bar and the cutting blades can be adjusted. It will be noted that a shearing effect is produced as the cutting blades pass the cutting bar owing to the helical form of the blades. It will also be noted that the clearance between the housing and the cutting wheel and blades is less on the approach side than on the discharge side of the wheel. This produces more suction on the discharge side which tends to draw the feathers out of the feeding slot in contact with the cutting bar, the cut feathers being then sucked into the discharge flue.

The feeding or agitating wheel is provided with agitating blades 16 whose ends 18 are of triangular cross-section as shown in Fig. 2, the blades being welded or otherwise secured to the shaft 14. It will be noted that the ends of the agitating blades are provided with leading edges or slanting faces 30 which are sloped in such direction that they tend to push or force the feathers into the feeding slot. This action, combined with the suction produced by the blower, produces a fairly uniform feed of feathers to the cutter bar.

I have found that the clearance between the cutting bar and the edges of the cutting blades should be of the order of 1 to 3 thousandths of an inch for best results. The width of the feeding slot should be from about ⅜ to ¾ inch, depending somewhat upon the size and type of feather which is being cut. The cutting blades should protrude not substantially more than ½ inch beyond the cylindrical shield, but this distance can be varied between about 1/16 to ½ inch, depending upon the fineness of the material desired. A distance of about ¼ inch produces best results with chicken feathers.

The closer the shield to the cutting edges of the cutting blades, the finer the comminuted product which is produced. This shield forms an important feature of my invention since I have found that in its absence inferior results are produced. It is impossible to obtain a uniform cut without it. The feeding wheel tends to push the feathers through the feed slot somewhat irregularly and if there is nothing to check the feathers as they are passing through the slot an irregular cut results. Some of the smaller and lighter feathers may even pass through without being cut, possibly due to the suction produced by the blower.

In one specific embodiment of my invention I rotated the cutting and feeding wheels at about 400 R. P. M. The cutting wheel was about 6½ inches in diameter while the feeding wheel was half this size. This mill proved to be highly satisfactory in performance.

While I have described what I consider to be the best embodiments of my cutting mill, it is obvious, of course, that various changes can be made in the specific structures which have been described and shown in the drawing without departing from the purview of this invention. While my mill was developed primarily for the cutting of feathers I have found that it has considerable advantages over other mills in the cutting of material of somewhat similar properties. These materials include silk waste, noils, cotton mill waste, cotton linters, stuff cuttings, kapok, milk weed floss and other light fibrous materials of similar nature. The degree of vacuum or suction employed can be varied rather widely but best results are obtained when the vacuum within the cutting wheel casing is within the range of about 1 to 24 inches of water. The higher the vacuum the more rapidly the cutting wheel should be rotated. Various types of blowers can be employed and, if desired, dust separators can be used to separate the product. My mill can be made in various sizes but the spacing of the cutting blades (ranging from about 1 to 4 inches) and the distances between the shield and the cutting edges of the cutting blades (varying from about 1/16 to 1/2 inch) should remain about the same regardless of size. These dimensions will vary to some extent, however, with the material to be comminuted. Cutting blades with straight edges can be employed but best results are obtained with helical blades. The feeding wheel can be equipped with helical blades if desired but this has but little effect upon the operation of the mill. Various means can be employed for driving the feeding and cutting wheels and various means for adjusting the width of the feeding slot and the clearance between the cutting bar and the cutting blades can be employed. Other modifications of this invention which fall within the scope of the following claims will be immediately evident to those skilled in this art.

What I claim is:

1. A mill for cutting feathers and materials of similar nature, which comprises in combination a casing, a rotary cutting wheel mounted in said casing, a hopper mounted above said casing for receiving the material to be comminuted provided at the bottom with a feeding slot communicating with said casing, a feeding wheel mounted at the bottom of said hopper, agitating blades mounted on said feeding wheel adapted to agitate said material and tending to force the material to be comminuted through said feeding slot, a cutting bar mounted along one edge of said slot, a plurality of cutting blades having outer cutting edges mounted on said cutting wheel and cooperating with said cutting bar to cut material passed through said feeding slot, a cylindrical shield extending between said cutting blades spaced immediately adjacent and not over 1/2 inch below said cutting edges and adapted to check the feathers passing through said feeding slot and to hold them adjacent said cutting bar, means for exhausting air and comminuted product from said casing mounted substantially at right angles to said feeding slot in the direction of travel of said cutting blades and means for rotating said cutting wheel and said feeding wheel.

2. The cutting mill of claim 1 wherein said cutting blades are helical in form making an angle of about 30° with the axis of the cutting wheel and producing a shearing effect during cutting.

3. The cutting mill of claim 1 wherein said cutting blades are spaced apart a distance within the range of about 1 to 4 inches at the periphery of the blades.

4. The cutting mill of claim 1 wherein the distance from said shield to the cutting edges of said cutting blades is within the range of about 1/16 to 1/2 inch.

5. The cutting mill of claim 1 wherein the distance from said shield to the cutting edges of said cutting blades is about 1/4 inch.

6. A mill for cutting feathers which comprises in combination a hopper for receiving feathers to be cut, a casing beneath said hopper, said hopper and said casing being in communication by means of a feeding slot, means for agitating the feathers at the bottom of said hopper and for forcing them into said slot, a cutting bar extending along one edge of said slot, a rotary cutting wheel mounted in said casing just below said cutting bar, cutting blades mounted on said wheel having cutting edges which pass in cutting proximity to said bar, said cutting wheel being provided with a shield extending between the cutting blades and spaced not substantially more than 1/2 inch below the cutting edges of said blades, means for rotating said cutting wheel and means for exhausting air and cut feathers from said casing and for producing a suction beneath said feeding slot to suck feathers therethrough; said exhausting means being mounted approximately 90° from said feeding slot in the direction of travel of said cutting blades.

7. The cutting mill of claim 6 wherein said agitating means is a rotary wheel provided with blades which at the ends are provided with slanting faces tending to force the feathers through said slot.

8. The cutting mill of claim 6 wherein the cutting blades protrude from the shield a distance within the range of about 1/16 to 1/2 inch.

9. A mill for cutting feathers which comprises in combination a casing, a hopper for receiving feathers to be mounted above said casing, said hopper and said casing communicating by means of a feeding slot, a cutting bar mounted along one edge of said feeding slot, a rotary feeding wheel mounted at the bottom of said hopper, agitating blades having ends of triangular cross-section mounted on said feeding wheel in such manner that said ends tend to force feathers through said slot, a rotary cutting wheel mounted just below said cutting bar, helical cutting blades having cutting edges mounted to pass in cutting proximity to said cutting bar, shield sections forming a cylindrical casing surrounding said cutting wheel leaving the cutting edges of said cutting blades protruding a distance of about 1/4 inch, means for exhausting air and cut feathers from said casing and for producing a slight suction at said feeding slot, and means for rotating said feeding wheel and said cutting wheel.

10. A mill for cutting feathers which comprises in combination a casing, a hopper for receiving feathers mounted above said casing, said hopper and said casing communicating by means of a feeding slot, a cutting bar mounted along one edge of said feeding slot, a rotary feeding wheel mounted at the bottom of said hopper, agitating blades mounted on said feeding wheel having slanting faces tending to force feathers through said feeding slot and against said cutting bar, a cutting wheel rotatably mounted in said casing below said cutting bar in such manner that the clearance provided between said wheel and said casing on the approach side is less than on the discharge side of said wheel, cutting blades mounted on said wheel having cutting edges which pass in cutting proximity to said cutting bar, shield sections forming a cylindrical casing surrounding said cutting wheel between the blades and spaced from about 1/16 to 1/2 inch below the cutting edges of said blades, means for exhausting air and cut feathers from said casing and for producing a slight suction at said feeding slot, and means for rotating said feeding wheel and said cutting wheel.

11. A mill for cutting feathers which comprises in combination a casing, a hopper for receiving feathers mounted above said casing, said hopper and said casing communicating by means of a feeding slot, a cutting bar mounted along one edge of said feeding slot, a rotary feeding wheel mounted at the bottom of said hopper, agitating blades mounted on said feeding wheel having slanting faces tending to force feathers through said feeding slot and against said cutting bar, a cutting wheel rotatably mounted in said casing below said cutting bar in such manner that the clearance provided between said wheel and said casing on the approach side is less than on the discharge side of said wheel, cutting blades mounted on said wheel having cutting edges which pass in cutting proximity to said cutting bar, shield sections forming a cylindrical casing surrounding said cutting wheel between the blades thereof and spaced from about 1/16 to 1/2 inch below the cutting edges of said blades, an exhaust flue communicating with said casing on the discharge side of said cutting wheel, means for producing sufficient suction in said flue to cause suction at said feeding slot, and means for rotating said feeding wheel and said cutting wheel.

12. A mill for cutting feathers which comprises in combination a casing, a hopper for receiving feathers mounted above said casing, said hopper and said casing communicating by means of a feeding slot, a cutting bar mounted along one edge of said feeding slot, a rotary feeding wheel mounted at the bottom of said hopper, agitating blades mounted on said feeding wheel having slanting faces tending to force feathers through said feeding slot and against said cutting bar, a cutting wheel rotatably mounted in said casing below said cutting bar in such manner that the clearance provided between said wheel and said casing on the approach side is less than on the discharge side of said wheel, cutting blades mounted on said wheel having cutting edges which pass in cutting proximity to said cutting bar, an exhaust flue communicating with said casing on the discharge side of said cutting wheel, means for producing sufficient suction in said flue to cause a partial vacuum within the range of 1 to 24 inches of water throughout the casing, and means for rotating said feeding wheel and said cutting wheel said casing being closed except at the feeding slot and the exhaust flue.

TOM SLICK.

REFERENCES CITED

The following references are of record in the file of this patent:

UNITED STATES PATENTS

| Number | Name | Date |
|---|---|---|
| Re. 8,821 | Richmond | July 22, 1879 |
| 79,513 | Sturgis | Jan. 30, 1868 |
| 130,505 | Jones, Jr. | Aug. 13, 1872 |
| 200,197 | Hicks | Feb. 12, 1878 |
| 380,245 | Creager | Mar. 27, 1888 |
| 526,043 | Merrill | Sept. 18, 1894 |
| 538,654 | Burton | May 7, 1895 |
| 1,201,025 | Derr | Oct. 10, 1916 |
| 1,525,025 | Dahl et al. | Feb. 3, 1925 |
| 1,568,520 | Martens | Jan. 5, 1926 |
| 1,620,303 | Uhrig | Mar. 8, 1927 |
| 1,713,094 | Saiberlich | May 14, 1929 |
| 1,826,891 | Krogan | Oct. 13, 1931 |
| 1,973,169 | Ielfield | Sept. 11, 1934 |
| 2,171,949 | Roca | Sept. 5, 1939 |

FOREIGN PATENTS

| Number | Country | Date |
|---|---|---|
| 19,044 | Norway | June 2, 1909 |